US011991955B2

(12) United States Patent
Frick et al.

(10) Patent No.: US 11,991,955 B2
(45) Date of Patent: May 28, 2024

(54) SYSTEMS AND METHODS FOR OPERATING A ROBOTIC MACHINE IN AN AUTONOMOUS MODE AND A MANUAL MODE

(71) Applicant: THE TORO COMPANY, Bloomington, MN (US)

(72) Inventors: Alexander Steven Frick, Farmington, MN (US); Aaron Yarrow Curtis, Eagan, MN (US); Khari Sekou Clarke, Minneapolis, MN (US)

(73) Assignee: THE TORO COMPANY, Bloomington, MN (US)

( * ) Notice: Subject to any disclaimer, the term of this patent is extended or adjusted under 35 U.S.C. 154(b) by 783 days.

(21) Appl. No.: 17/053,282

(22) PCT Filed: May 14, 2019

(86) PCT No.: PCT/US2019/032195
§ 371 (c)(1),
(2) Date: Nov. 5, 2020

(87) PCT Pub. No.: WO2019/226415
PCT Pub. Date: Nov. 28, 2019

(65) Prior Publication Data
US 2021/0235619 A1 Aug. 5, 2021

Related U.S. Application Data

(60) Provisional application No. 62/676,377, filed on May 25, 2018.

(51) Int. Cl.
*A01D 34/73* (2006.01)
*A01D 34/00* (2006.01)
(Continued)

(52) U.S. Cl.
CPC ......... *A01D 34/733* (2013.01); *A01D 34/008* (2013.01); *A01D 34/81* (2013.01); *A01D 34/82* (2013.01); *A01D 42/00* (2013.01)

(58) Field of Classification Search
CPC .... A01D 34/733; A01D 34/008; A01D 34/81; A01D 34/82; A01D 42/00
See application file for complete search history.

(56) References Cited

U.S. PATENT DOCUMENTS 2,734,325 A * 2/1956 Bonte ................... A01D 43/16
56/16.9
6,009,358 A * 12/1999 Angott ................. G05D 1/0261
340/936
(Continued)

FOREIGN PATENT DOCUMENTS

CN 205865175 U 1/2017
CN 106535614 A 3/2017
(Continued)

OTHER PUBLICATIONS

Extended European Search Report for EP Application No. 22 15 3706.1, dated Apr. 20, 2022, 7 pages.
(Continued)

*Primary Examiner* — Alicia Torres
(74) *Attorney, Agent, or Firm* — Mueting Raasch Group

(57) ABSTRACT

Apparatus, systems, and methods for operating an autonomous vehicle. In some embodiments, the vehicle can include a mower having a cutting deck. The deck can include an upper wall and downwardly extending sidewalls forming a cutting chamber. The vehicle may include a cutting blade assembly contained within the cutting chamber. A distance between the cutting blade assembly and a trim edge of the mower deck can be changed.

16 Claims, 5 Drawing Sheets

(51) Int. Cl.
  *A01D 34/81* (2006.01)
  *A01D 34/82* (2006.01)
  *A01D 42/00* (2006.01)

(56) References Cited

U.S. PATENT DOCUMENTS

| | | | |
|---|---|---|---|
| 6,082,083 | A | 7/2000 | Stalpes et al. |
| 7,401,456 | B2 | 7/2008 | Korthals |
| 8,781,627 | B2 | 7/2014 | Sandin et al. |
| 8,783,005 | B1 * | 7/2014 | Bernard ............ A01D 34/84 56/13.7 |
| 8,954,193 | B2 | 2/2015 | Sandin et al. |
| 9,021,777 | B2 | 5/2015 | Johnson et al. |
| 9,043,952 | B2 | 6/2015 | Sandin et al. |
| 9,043,953 | B2 | 6/2015 | Sandin et al. |
| 9,220,194 | B2 | 12/2015 | Ulmefors et al. |
| 9,420,741 | B2 | 8/2016 | Balutis et al. |
| 9,538,702 | B2 | 1/2017 | Balutis et al. |
| 10,973,168 | B2 | 4/2021 | Hans et al. |
| 2008/0039974 | A1 | 2/2008 | Sandin et al. |
| 2008/0161968 | A1 * | 7/2008 | Adegbile ............ A01D 34/008 15/300.1 |
| 2014/0102062 | A1 | 4/2014 | Sandin et al. |
| 2015/0271991 | A1 | 10/2015 | Balutis et al. |
| 2015/0316913 | A1 | 11/2015 | Rickey et al. |
| 2016/0165795 | A1 | 6/2016 | Balutis et al. |
| 2016/0174459 | A1 | 6/2016 | Balutis et al. |
| 2017/0364090 | A1 | 12/2017 | Grufman et al. |
| 2017/0367257 | A1 | 12/2017 | Cmich et al. |
| 2018/0168097 | A1 | 6/2018 | Yamauchi et al. |
| 2018/0206402 | A1 | 7/2018 | Ran et al. |
| 2018/0352732 | A1 * | 12/2018 | Hans ............ A01D 34/008 |

FOREIGN PATENT DOCUMENTS

| | | | | |
|---|---|---|---|---|
| DE | 212014000186 | U1 | 4/2016 | |
| DE | 102021129014 | A1 * | 5/2022 | ............ A01D 34/84 |
| EP | 2547193 | B1 | 3/2017 | |
| EP | 3067771 | B1 | 11/2017 | |
| EP | 3404505 | A1 | 11/2018 | |
| EP | 2939513 | B1 | 11/2019 | |
| EP | 3262915 | B1 | 11/2019 | |
| EP | 3 412 128 | B1 | 5/2021 | |
| JP | H05-23031 | A * | 2/1993 | |
| WO | 2007/109624 | A2 | 9/2007 | |
| WO | 2015/040987 | A1 | 3/2015 | |
| WO | WO-2015053488 | A1 * | 4/2015 | ............ A01D 34/008 |
| WO | 2016/099616 | A1 | 6/2016 | |
| WO | 2017/004517 | A1 | 1/2017 | |
| WO | 2018/000922 | A1 | 1/2018 | |
| WO | 2018/038754 | A1 | 3/2018 | |
| WO | 2019/226415 | A1 | 11/2019 | |
| WO | 2020/033522 | A2 | 2/2020 | |
| WO | 2021036033 | A1 | 3/2021 | |
| WO | 2021/096722 | A1 | 5/2021 | |
| WO | 2021/098382 | A1 | 5/2021 | |

OTHER PUBLICATIONS

Chinese Search Report for CN Application No. 201980034998.8, dated May 19, 2022, 2 pages.

U.S. Appl. No. 62/676,377 (priority application), filed May 25, 2018 titled Systems and Methods for Operating a Robotic Machine in an Autonomous Mode and a Manual Mode.

Written Opinion of the International Preliminary Examining Authority for PCT/US2019/032195 dated Apr. 6, 2020, 6 pages.

International Search Report and Written Opinion for PCT/US2019/032195 dated Aug. 21, 2019, 14 pages.

International Preliminary Report on Patentability for PCT/US2019/032195 dated Oct. 7, 2020, 15 pages.

Batavia et al., "Autonomous coverage operations in semi-structures outdoor environments" IEEE/RSJ International Conference on Intelligent Robots and Systems, Lausanne, Switzerland, Sep. 30-Oct. 4, 2002, available online at least as early as Dec. 10, 2002. Abstract retrieved from the Internet on Nov. 6, 2023: <URL: https://ieeexplore.ieee.org/abstract/document/1041479>; 11 pgs.

* cited by examiner

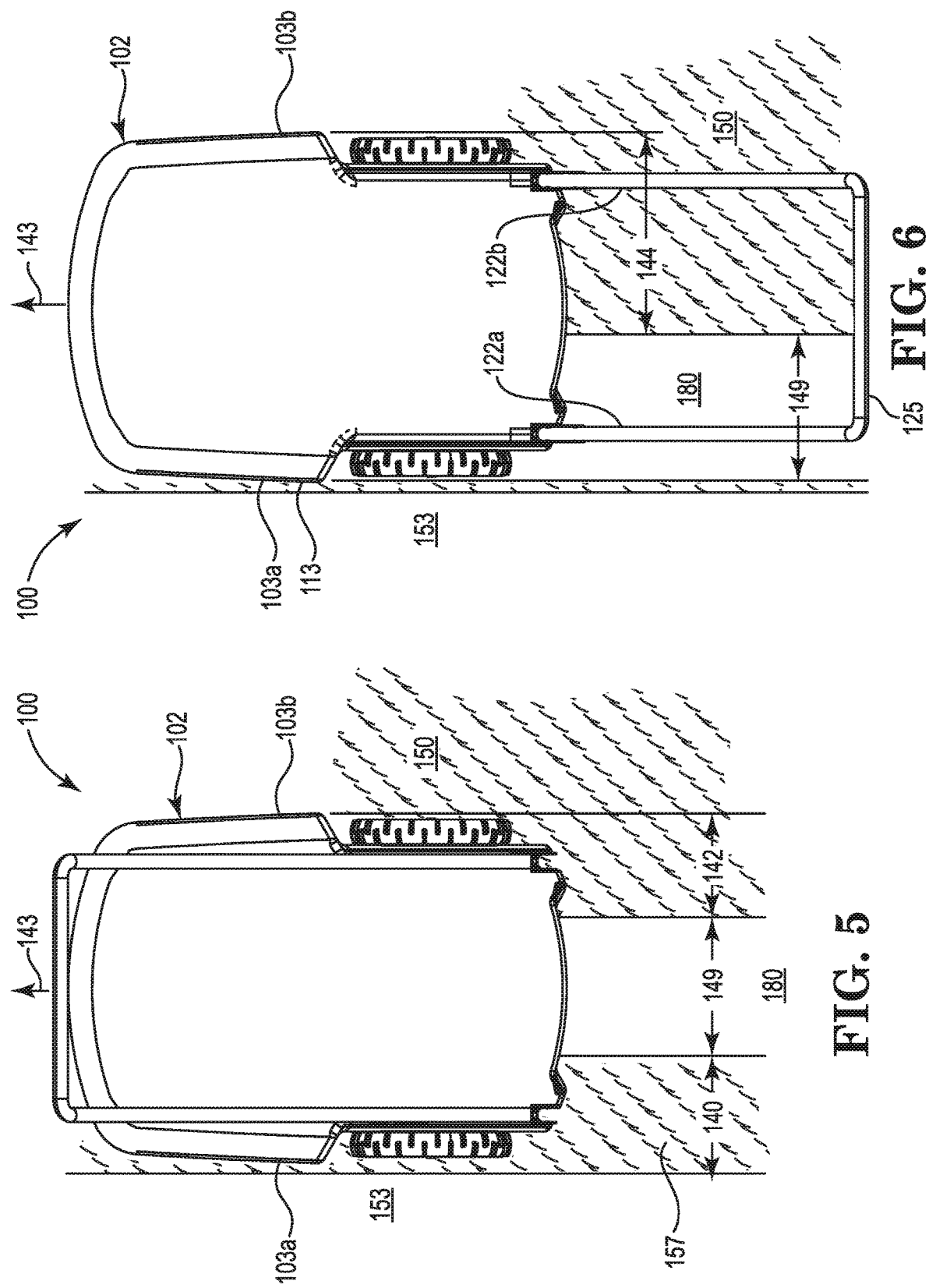

SYSTEMS AND METHODS FOR OPERATING A ROBOTIC MACHINE IN AN AUTONOMOUS MODE AND A MANUAL MODE

This application is a 35 U.S.C. § 371 U.S. National Stage of International Application No. PCT/US2019/032195, filed 14 May 2019, which claims the benefit of U.S. Provisional Patent Application No. 62/676,377, filed 25 May 2018, the disclosures of which are incorporated herein by reference in their entireties.

Embodiments of the present disclosure relate to autonomous working machines (e.g., lawn mowers) and, more particularly, to systems and methods for selectively permitting operation of such machines in multiple modes.

BACKGROUND

Lawn and garden machines are known for performing a variety of tasks. For instance, powered lawn mowers are used by both homeowners and professionals alike to maintain turf areas within a property or yard.

Mowers that autonomously perform a grass cutting function are also known. Autonomous mowers typically include a cutting deck having one or more cutting blades. A battery-powered electric motor is generally included to power both the cutting blades and a propulsion system. Depending on the property size, the mower may cut only a portion of the property before returning to a base station for battery re-charging.

Autonomous mowers typically cut grass in a random travel pattern within the property boundary. In some configurations, the property boundary is defined by a continuous boundary marker, e.g., an energized wire laying on, or buried beneath, the lawn. Such boundary wires may also extend into the interior of the yard to demarcate obstacles (e.g., trees, flower beds, etc.) or other excluded areas. The mower may then move randomly within the areas delineated by the boundary wire.

Autonomous mowers by definition may operate without direct operator involvement. As a result, such mowers often position the cutting blades sufficiently inboard from an edge or sidewall of the cutting deck to minimize, for instance, inadvertent contact of the blades with foreign objects.

While effective, locating the cutting blades at such an inboard position makes trimming (i.e., mowing close to obstacles and boundaries such as houses and landscaping) difficult as the cutting blades are spaced-apart too far from the sidewalls of the cutting deck. As a result, a secondary trimming device (e.g., conventional mower or string trimmer) may be required to mow these areas unreachable by the autonomous mower.

SUMMARY

Embodiments described herein may provide a method of operating a robotic machine in an autonomous mode and, alternatively, in a manual mode. For example, in one embodiment, an autonomous lawn mower is provided that includes a cutting deck having an upper wall and a trim edge. A cutting blade assembly is also provided and supported by the cutting deck, wherein the cutting blade assembly or the trim edge selectively moves, relative to the other of the cutting blade assembly or the trim edge, between a first position and a second position.

In another embodiment, an autonomous lawn mower is provided that includes a cutting deck having an upper wall and downwardly extending sidewalls forming a cutting chamber. At least one of the sidewalls may form a trim edge. The mower further includes wheels adapted to support the deck in rolling engagement upon a ground surface; and a rotatable cutting blade assembly contained within the cutting chamber, wherein the rotatable cutting blade assembly is positioned a first offset distance from the trim edge when the mower is configured in an autonomous mode, and wherein the rotatable cutting blade assembly is positioned a second offset distance from the trim edge when the mower is configured in a manual mode, the second offset distance being less than the first offset distance. The mower also includes a handle adapted to connect to the cutting deck and configurable in: an autonomous mode position corresponding to the cutting blade assembly being located at the first offset distance from the trim edge, and a manual mode position, corresponding to the cutting blade assembly being located at the second offset distance from the trim edge.

In yet another embodiment, a method of reconfiguring a robotic mower from an autonomous mode to a manual mode is provided that includes re-locating a handle of the mower from an autonomous mode position to a manual mode position, wherein the handle, when in the manual mode position, is connected to a cutting deck and forms a grip area accessible to an operator walking behind the cutting deck. The cutting deck further includes an upper wall and a downwardly extending sidewall partially surrounding a cutting chamber. The method further includes moving either a cutting blade assembly contained within the cutting chamber or the sidewall from: a first position wherein the cutting blade assembly is spaced-apart from the sidewall by a first offset distance; to a second position wherein the cutting blade assembly is spaced-apart from the sidewall by a second offset distance that is less than the first offset distance.

In still another embodiment, an autonomous mower is provided that includes a cutting deck having an upper wall and downwardly extending sidewalls forming a cutting chamber. The mower also includes a cutting blade assembly contained within the cutting chamber, wherein the cutting blade assembly or one or more of the sidewalls is movable between a first position and a second position.

In still yet another embodiment, an autonomous lawn mower is provided that includes: a cutting deck; a cutting blade assembly supported by the cutting deck; a handle connected the cutting deck, the handle configurable in an autonomous mode position and a manual mode position; and a cradle adapted to receive a tablet or smartphone therein.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIGS. 5-6 illustrate top plan views of an exemplary mower operating within a work region, wherein: FIG. 5 illustrates the mower operating in the autonomous mode; and FIG. 6 illustrates the mower operating in the manual mode;

Figure 1:
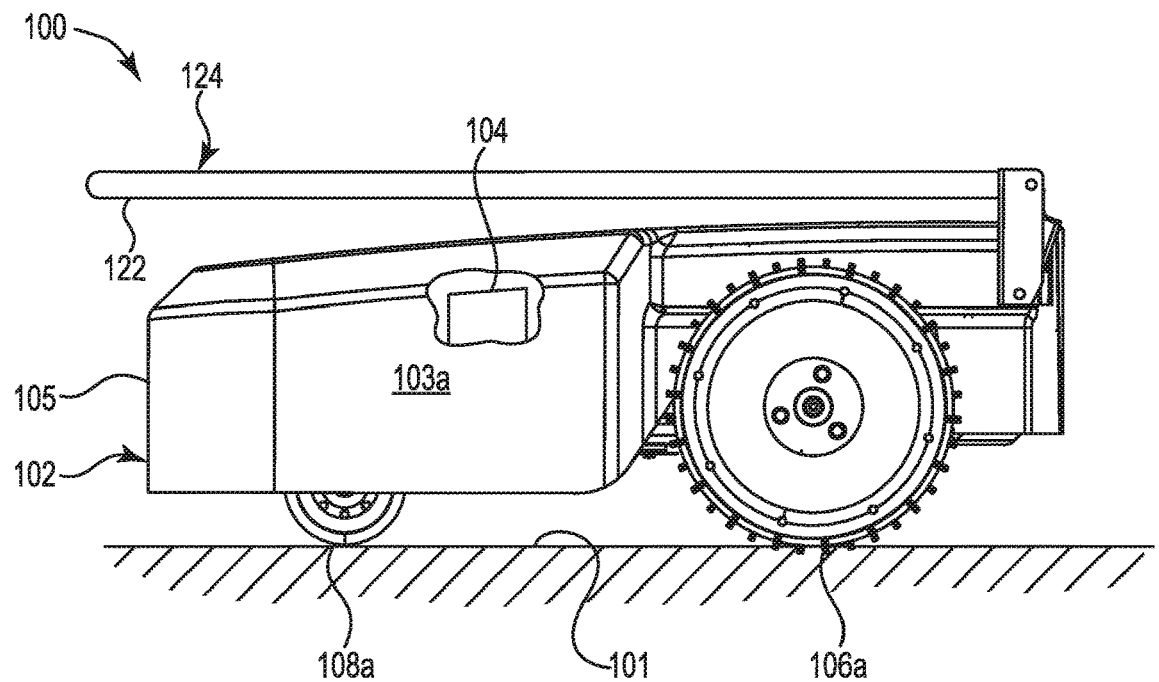
FIG. 1 is a side elevation view of an autonomous working vehicle, e.g., lawn mower, in accordance with embodiments of the present disclosure, the mower shown in an autonomous mode.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Further, the term "and/or" (if used) means one or all of the listed elements or a combination of any two or more of the listed elements. Still further, "i.e." may be used herein as an abbreviation for the Latin phrase id est, and means "that is," while "e.g." may be used as an abbreviation for the Latin phrase exempli gratia and means "for example."

Embodiments of the present disclosure are directed to autonomous machines or vehicles and to methods of operating the same within a predefined work region (e.g., a turf or other ground surface of a residential or commercial property). Such machines may operate in an autonomous mode and, alternatively, in a manual mode to achieve improved vehicle coverage (e.g., with an implement associated with the vehicle) of the work region. For example, the vehicle may be an autonomous lawn mower adapted to cut grass as the mower travels over the work region. In the autonomous mode, mowers in accordance with embodiments of the present disclosure may operator with little or no operator involvement. However, the mower may selectively be configured in a manual mode, wherein it may be controlled by an operator in a manner similar to a conventional walk power lawn mower. For reasons further described below, such a dual mode mower may provide more versatile cutting coverage than may otherwise be available using an "autonomous-only" mower.

While described herein as a mower, such a configuration is exemplary only as systems and methods described herein also have application to other autonomously operated vehicles including, for example, commercial turf products, other ground working vehicles (e.g., debris blowers/vacuums, aerators, material spreaders, snow throwers), as well as indoor working vehicles such as vacuums and floor scrubbers/cleaners.

It is noted that the terms "have," "includes," "comprises" and variations thereof do not have a limiting meaning and are used in their open-ended sense to generally mean "including, but not limited to," where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the vehicle (e.g., mower 100) is operating upon a ground surface 101 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Figure 2:
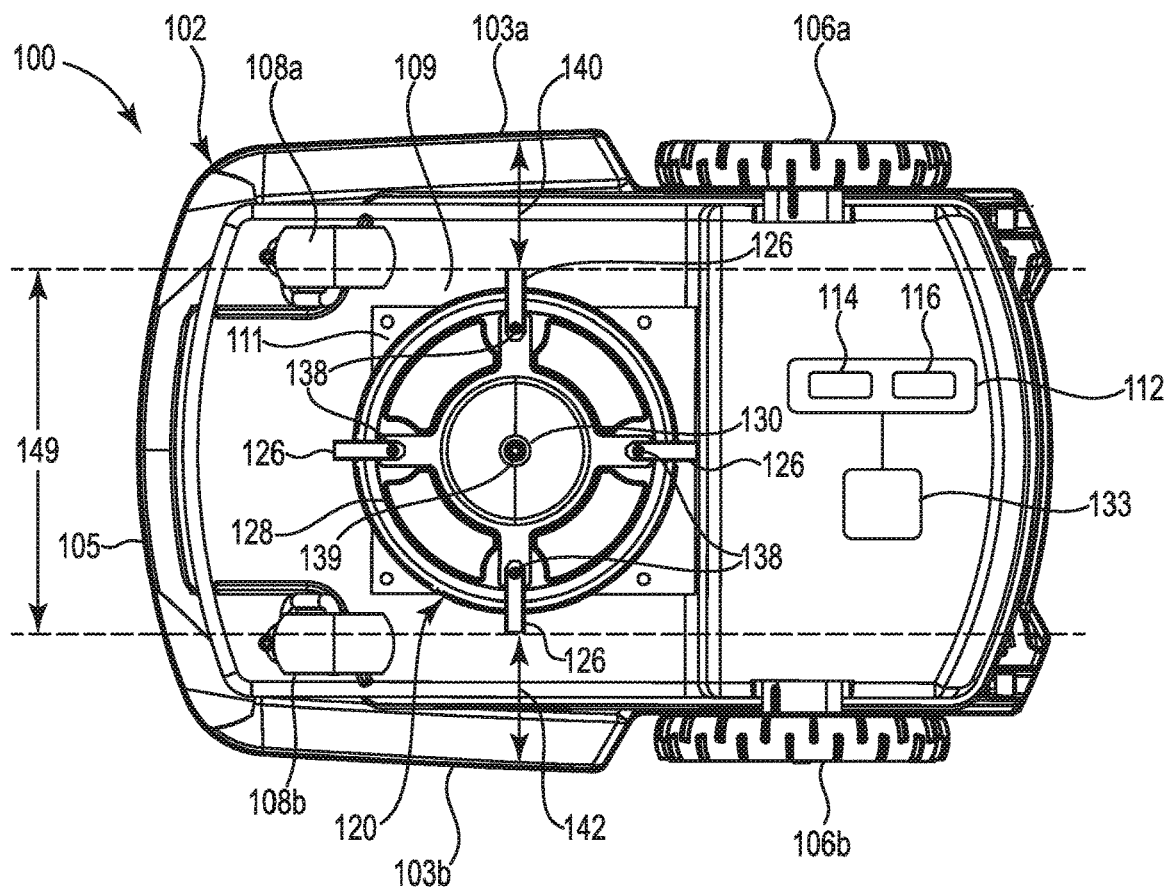
FIG. 2 is a bottom plan view of the autonomous mower of FIG. 1 (in the autonomous mode)

FIGS. 1 and 2 illustrate a side elevation view and bottom plan view, respectively, of an exemplary working vehicle, e.g., autonomous lawn mower 100, configured in an autonomous mode in accordance with embodiments of the present disclosure. The mower 100 may include a cutting housing or deck 102 supported in rolling engagement upon a ground surface 101 by a plurality of ground-engaging wheels. For example, rear wheels 106 (e.g., rear wheels 106a, 106b) and front wheels 108 (e.g., front wheels 108a, 108b) may be attached, respectively, at or near the rear and front sides of the deck 102 as shown. The wheels may rotate, relative to the deck 102, as the deck moves over the ground surface 101. Some of the wheels (e.g., the rear wheels 106) may be powered to propel the mower during operation. For example, the rear wheels 106 may be independently driven in forward and reverse directions, while the front wheels may caster. As a result, differential rotation of the rear wheels 106 may affect both forward and reverse propulsion as well as steering of the mower 100.

The deck 102 may include an upper wall 111 (see FIG. 2) and downwardly extending sidewalls (e.g., left and right sidewalls 103 (e.g., left sidewall 103a, right sidewall 103b), and front sidewall 105) forming a partially enclosed, downwardly (as viewed in FIG. 1) opening cutting chamber 109. In some embodiments, some or all of the sidewalls may be formed by a perimeter bump shroud as shown that may be used to detect contact with obstacles. The transverse outer edges of the left and right sidewalls 103 may extend outwardly to or beyond the rear wheel track width for reasons that will become apparent. One or more of the sidewalls, e.g., left sidewall 103a, may form a trim edge of the mower as further described below.

The mower 100 may also include a prime mover, e.g., electric motor 104, that in one embodiment, is attached to the upper wall 111 of the deck 102. While illustrated herein as an electric motor 104, alternative prime movers, such as internal combustion engines, are also contemplated. Other components, e.g., battery 133 (see FIG. 2), may also be attached to the deck 102.

The motor 104 may include an output shaft 130 that extends vertically downward (in FIG. 1) through the upper wall 111 of the deck 102 and into the cutting chamber 109. A ground-working tool (e.g., rotatable cutting blade assembly 120) may be supported by the cutting deck, e.g., attached to a lower end of the shaft 130 and contained, at least partially, within the cutting chamber 109. The cutting blade assembly 120 may include a plurality of cutting blades 126 (e.g., four cutting blades) attached to a disk 128. In some embodiments, each of the cutting blades 126 may be pivotally attached to the disk 128 by a pin or fastener 138. The disk 128 may be attached, directly or indirectly, to the output shaft 130, by a fastener 139.

During operation, the output shaft 130 rotates the cutting blade assembly 120 at a speed sufficient to permit the blades 126 to sever grass and other vegetation over which the deck 102 passes. By pivotally connecting each cutting blade 126 to the rotating disk 128, the cutting blades are capable of incurring blade strikes against various objects (e.g., rocks, tree roots, etc.) without causing excessive damage to the blades 126, blade assembly 120, shaft 130, or motor 104. While described herein in the context of one or more cutting "blades," other cutting elements including, for example, conventional mower blades, nylon string or line elements, etc., are certainly possible without departing from the scope of this disclosure.

As stated above, the wheels 106 may be powered, e.g., by the same motor 104 or a separate motor (not shown), so that the mower 100 is self-propelled. While shown having four wheels, other embodiments may utilize any number of wheels (e.g., two or more). Still further, as used herein, "wheels" may include other ground-engaging members such as tracks, rollers, and skids.

The mower 100 may include one or more sensors (not shown) to assist with localization. For instance, some embodiments may include a global positioning system (GPS) receiver adapted to estimate a position of the mower 100 within the work region and provide such information to a controller 112 (see FIG. 2). In other embodiments, one or more of the wheels 106, 108 may include encoders (not shown) that provide wheel rotation/speed information that may be used to estimate mower position (e.g., based upon an initial start position) within a given work region. Other sensors (e.g., vision, infrared, radio detection and ranging (radar), light detection and ranging (lidar), etc.) now known or later developed may also be incorporated into the mower 100. The mower 100 may further include sensors adapted to detect a boundary wire when the latter is used to define a boundary of the work region.

The controller 112 may be adapted to monitor and control various mower functions. An exemplary controller may include a processor 114 that receives various inputs and executes one or more computer programs or applications stored in memory 116. The memory may include computer-readable instructions or applications that, when executed, e.g., by the processor 114, cause the controller to perform various calculations and/or issue commands. That is to say, the processor 114 and memory 116 may together define a computing apparatus operable to process input data and generate the desired output to one or more components/devices. For example, the processor 114 may receive various input data including positional data from the GPS receiver and/or wheel encoders, and generate speed and steering angle commands to drive wheel motor(s) (not shown) and cause the drive wheels 106 to rotate (at the same or different speeds and in the same or different directions). In other words, the controller may control the steering angle and speed of the mower 100, as well as the speed and operation of the cutting blade assembly 120.

In view of the above, it will be readily apparent that the functionality of the controller 112 may be implemented in any manner known to one skilled in the art. For instance, the memory may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 112, the memory 116 and the processor 114 could be contained in separate modules.

The processor 114 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 114 may include multiple components, such as any combination of one or more microprocessors, one or more controllers, one or more DSPs, one or more ASICs, and/or one or more FPGAs, as well as other discrete or integrated logic circuitry. The functions attributed to the controller/processor herein may be embodied as software, firmware, hardware, or any combination thereof. In at least one embodiment, various subsystems of the mower 100, as described above, could be connected in most any manner, e.g., directly to one another, wirelessly, via a bus architecture (e.g., controller area network (CAN) bus), or any other connection configuration that permits data and/or power to pass between the various components (e.g., controller, motor 104, drive wheel system, sensors, etc.) of the mower.

Figure 3:
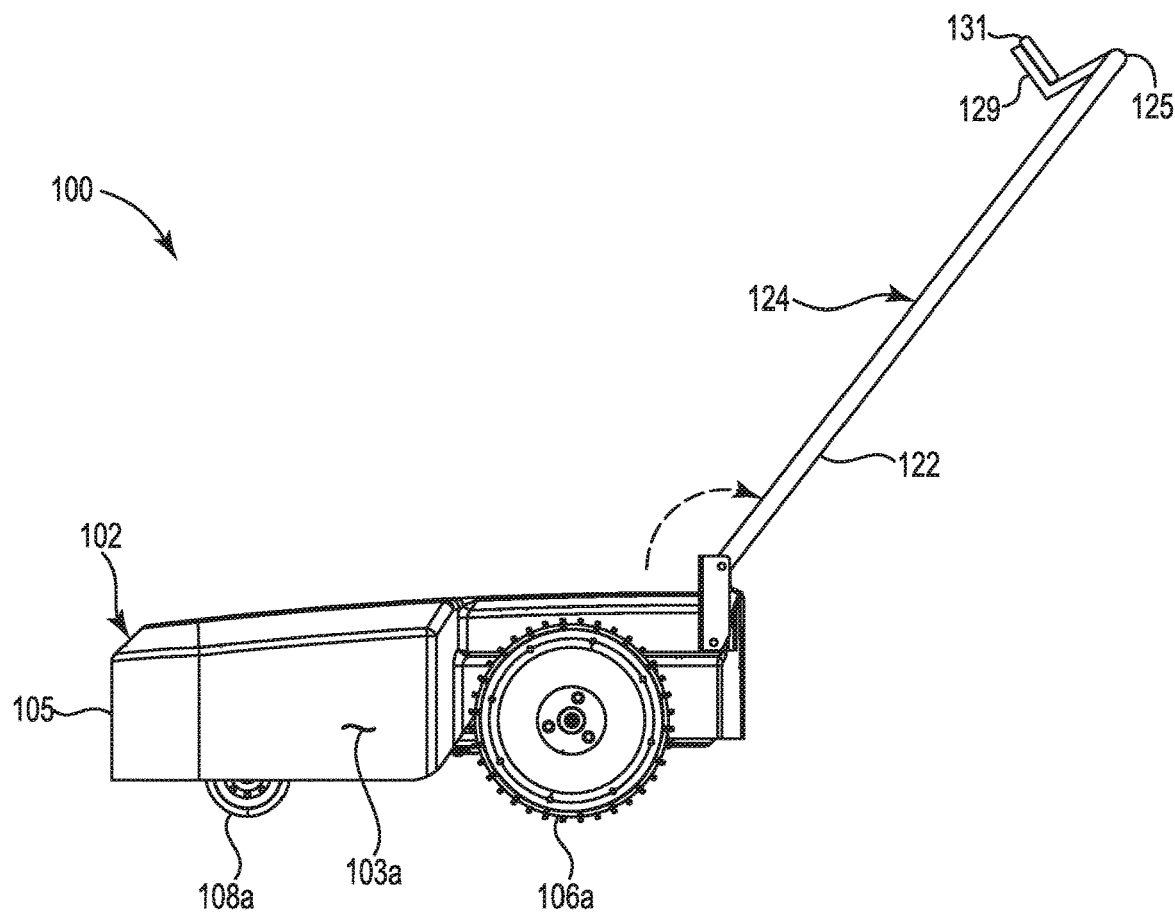
FIG. 3 is a side elevation view of the mower of FIG. 1 configured in a manual mode.
Figure 4:
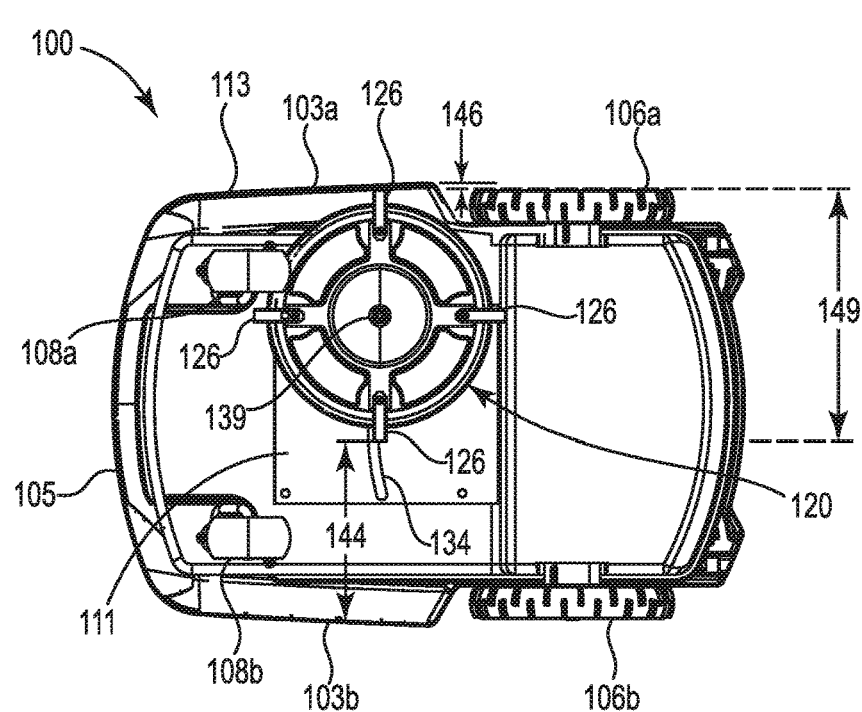
FIG. 4 is a bottom plan view of the mower of FIG. 3 (in the manual mode)

Unlike conventional autonomous lawnmowers, the mower 100 may also include an operator handle 124 associated with, or otherwise connected to, the cutting deck as shown in FIGS. 1 and 3 (the handle is removed in FIGS. 2 and 4). The handle 124 may be formed by one or more handle members or tubes 122 (e.g., first (left) and second (right) handle tubes 122a and 122b, respectively; see FIG. 6) that connect to the deck 102. The handle 124 is reconfigurable between an autonomous mode position (e.g., corresponding both to the autonomous mode of the mower 100 as shown in FIG. 1 and to a first position of the cutting blade assembly 120 as shown in FIG. 2 and as further described below) and a manual mode position (e.g., corresponding both to the manual mode of the mower 100 as shown in FIG. 3 and to a second or trimming position of the cutting blade assembly as shown in FIG. 4 and as also described below).

As illustrated in FIG. 1, when in the autonomous mode position, the handle 124 may be folded down such that it is located at or near the cutting deck. Alternatively, the handle 124 could be entirely removed from the deck 102 (i.e., the autonomous mode position may include detachment of the handle from the deck).

When in the manual mode position shown in FIG. 3, however, the handle 124 may be re-located or deployed from the autonomous mode position to a position extending generally upwardly and rearwardly in a manner similar to a conventional (non-autonomous) walk power mower. The handle 124 may extend sufficiently away from the deck to ensure that the operator, when gripping a grip area 125 of the handle 124 (see, e.g., FIG. 6), is located at a predetermined distance from the cutting deck 102.

In some embodiments, the handle tubes 122 may be laterally spaced from, and parallel to, one another and joined near their upper ends by the transverse grip area 125, producing a generally U-shaped handle (see, e.g., FIG. 6). To facilitate movement of the handle between the autonomous mode position and the manual mode position, the handle 124 may be pivotally attached to the deck 102, e.g., at or near the rear end of the deck 102 in a conventional manner to allow for pivoting (folding) downwardly when in the autonomous mode position (as shown in FIG. 1) or pivoting upwardly to the manual mode position (as shown in FIG. 3). Once again, in other embodiments, the handle 124 may be removed from the cutting deck 102 entirely in the autonomous mode position (e.g., when the mower is in the autonomous mode), and attached to the deck when in the manual mode position (e.g., when the mower is in the manual mode).

When the handle 124 is in the manual mode position, the grip area 125 of the handle may be positioned at a convenient height accessible for grasping by an operator walking behind the deck 102. The handle 124 may also be locked in the manual mode position (see FIG. 3) and, optionally, in the autonomous mode position (locking of the handle in the autonomous mode position may, however, be unnecessary as gravity may be sufficient to maintain this position).

As stated above, the autonomous mode position and the manual mode position of the handle 124 may correspond, respectively, to the two modes of operation of the mower 100: the autonomous mode illustrated in FIGS. 1-2; and the manual mode illustrated in FIGS. 3-4. As the name implies, when in the autonomous mode, the mower 100 may operate (cut grass) without direct operator involvement. To minimize unintended and inadvertent contact with objects by the cutting blade assembly 120 when the mower is in the autonomous mode (e.g., when the handle is in the autonomous mode position), the cutting blade assembly may be located at a first position within the cutting chamber 109 that is spaced-apart from one sidewall (e.g., from the left sidewall 103a/trim edge) by a first offset distance 140 and, of course, by a corresponding offset distance 142 from the opposite sidewall (e.g., the right sidewall 103b) as shown in FIG. 2. In some embodiments, the offset distances 140, 142 may be equal to one another and may be selected to locate the cutting blade assembly 120 centrally along the longitudinal axis of the mower.

Conversely, as the name implies, the manual mode (see FIGS. 3-4) may include operating the mower 100 under direct operator control. In the manual mode, the mower 100 may be operated in a manner generally similar to a conventional mower, e.g., using the handle 124 to allow operator control of the mower 100 from a walk-behind position. With the operator now in direct control of the mower 100 from his or her location behind the handle 124, he or she is able to detect objects approaching or otherwise in and around the mower. As a result, the manual mode (e.g., corresponding to manual mode position of the handle) may accommodate repositioning of the cutting blade assembly 120 (or the sidewall 103a) to a second position that is closer (as compared to the first position) to the sidewall 103 (or the blade assembly), i.e., the blades 126 of the blade assembly 120 may be located such that they operate at or near the left sidewall 103a as shown in FIG. 4. In this way, the left sidewall 103a becomes a trim edge 113 of the mower.

Such cutting blade positioning allows the mower 100 to cut grass along areas adjacent to obstacles, such areas being otherwise unreachable when the mower is in the autonomous mode (i.e., when the cutting blade assembly 120 is in the position shown in FIG. 2). For example, in the manual mode, outer tips of the blades 126 of the cutting blade assembly 120 may be at, or even outwardly beyond, outside edges of the left rear and front wheels 106a, 108a as shown in FIG. 4. As a result, the blades 126 may cut grass near or transversely beyond a wheel track (outer edge) of the left rear wheel 106a as indicated by the dotted line in FIG. 4.

Shifting of the cutting blade assembly 120 as described (to place the mower in the manual mode) results in the cutting blade assembly and cutting blades being spaced-apart from the sidewall 103a/trim edge 113 by a second offset distance 146 that is less than the first offset distance 140 (see FIG. 2). Similarly, when the mower is in the manual mode, the cutting blade assembly 120 may be located such that the blades 126 are also spaced-apart from the right sidewall 103b by a distance 144 greater than the distance 142 (the latter distance corresponding to the mower 100 being in the autonomous mode as shown in FIG. 2). Stated another way, the cutting blade assembly 120 may shift laterally relative to the cutting deck 102 as the mower is reconfigured between the autonomous and manual modes. However, a cutting width 149 of the deck 102 stays the same regardless of the operating mode.

Advantageously, the ability to reconfigure the mower 100 between the autonomous and manual modes allows the mower to operate autonomously while mowing a majority of a work area, and then operate manually to address those areas inaccessible during autonomous operation. As a result, the mower may be able to better maintain a property without the need for a separate trimming device (e.g., separate mower or string trimmer). In some embodiments, the power provided to the cutting blade assembly 120 by the motor 104 may increase (manually or automatically) when the mower is placed in the manual mode. While described herein as a "manual" mode of mower operation, such a description is not limiting as the manual mode may, in some embodiments, be an autonomous trimming mode in which the mower operates autonomously even when the cutting blade assembly is in the second ("trimming") position.

The handle 124 may include various controls (not shown) for controlling mower operation when in the manual mode. For instance, controls (e.g., bails, buttons, levers, etc.) for controlling propulsion, operator presence detection, blade engagement, etc., may be provided near the grip area 125 of the handle 124. In some embodiments, the handle 124 and controls may be configured as generally described in U.S. Pat. No. 6,082,083 to Stalpes et al. In other embodiments, the mower 100 (e.g., handle) may include a touchscreen or a cradle (see, e.g., cradle 129 in FIG. 3) adapted to receive a tablet or smartphone (see, e.g., smartphone 131 in FIG. 3). Software running on a computer associated with the touchscreen (e.g., the tablet or smartphone) may interact with the mower (e.g., via wired or wireless protocols) to provide various controls that would otherwise be provided by physical controls. Regardless of the control interface provided to the operator, he or she may control and manipulate the mower by interacting with the handle 124 and the various controls located thereon.

FIG. 5 illustrates the mower 100 while mowing a work region 150 in the autonomous mode. In the autonomous mode, the cutting blade assembly 120 is positioned as shown in FIG. 2. As indicated in FIG. 5, an obstacle 153 (building, landscape edging, etc.) may be adjacent the work region 150. As the mower 100 moves forwardly as indicated by arrow 143, the mower is able to cut grass in the work region 150 along a path 180 having a cutting width 149 (see also FIG. 2). As already described herein, the cutting width 149 (when the mower 100 is operating in the autonomous mode), may be generally longitudinally centered along the cutting deck 102. As a result, the mower 100 may leave a narrow portion of uncut grass 157 between the path 180 of the cutting blades 126 and the obstacle 153. In practice, the mower 100 may not actually mow continuously along the obstacle 153 but rather may move in a random pattern throughout the work area 150. Nonetheless, the offsets 140 and 142 shown in FIG. 5 present the issue with respect to mowing along the obstacle 153.

FIG. 6, on the other hand, illustrates the exemplary mower 100 of FIG. 1 operating in the same general area of the work region 150 while in the manual mode. As stated above, the manual mode allows shifting of the cutting blades 126 toward a trim edge 113 (e.g., left sidewall 103a) of the mower, thereby allowing the mower to cut grass more closely to the obstacle 153 than the mower may be able to achieve in autonomous mode. That is, with the cutting blade assembly 120 now shifted as shown in FIG. 4, the cutting width 149 remains the same, but the path 180 is now transversely shifted, relative to the deck 102, toward the left sidewall 103a as shown. This shifted position of the cutting blade assembly 120 allows mowing closer to the edge of the work region 150 (e.g., closer to the obstacle 153) than is permitted in the autonomous mode.

Most any mechanism that permits such shifting of the cutting blade assembly is contemplated. For example, the motor 104 may be directly coupled to the cutting blade assembly 120 such that the motor and cutting blade assembly are together slidable (e.g., manually) along a slot 134 (see FIG. 4) formed in the upper wall 111 as the cutting blade assembly moves between its first and second positions.

Figure 7:
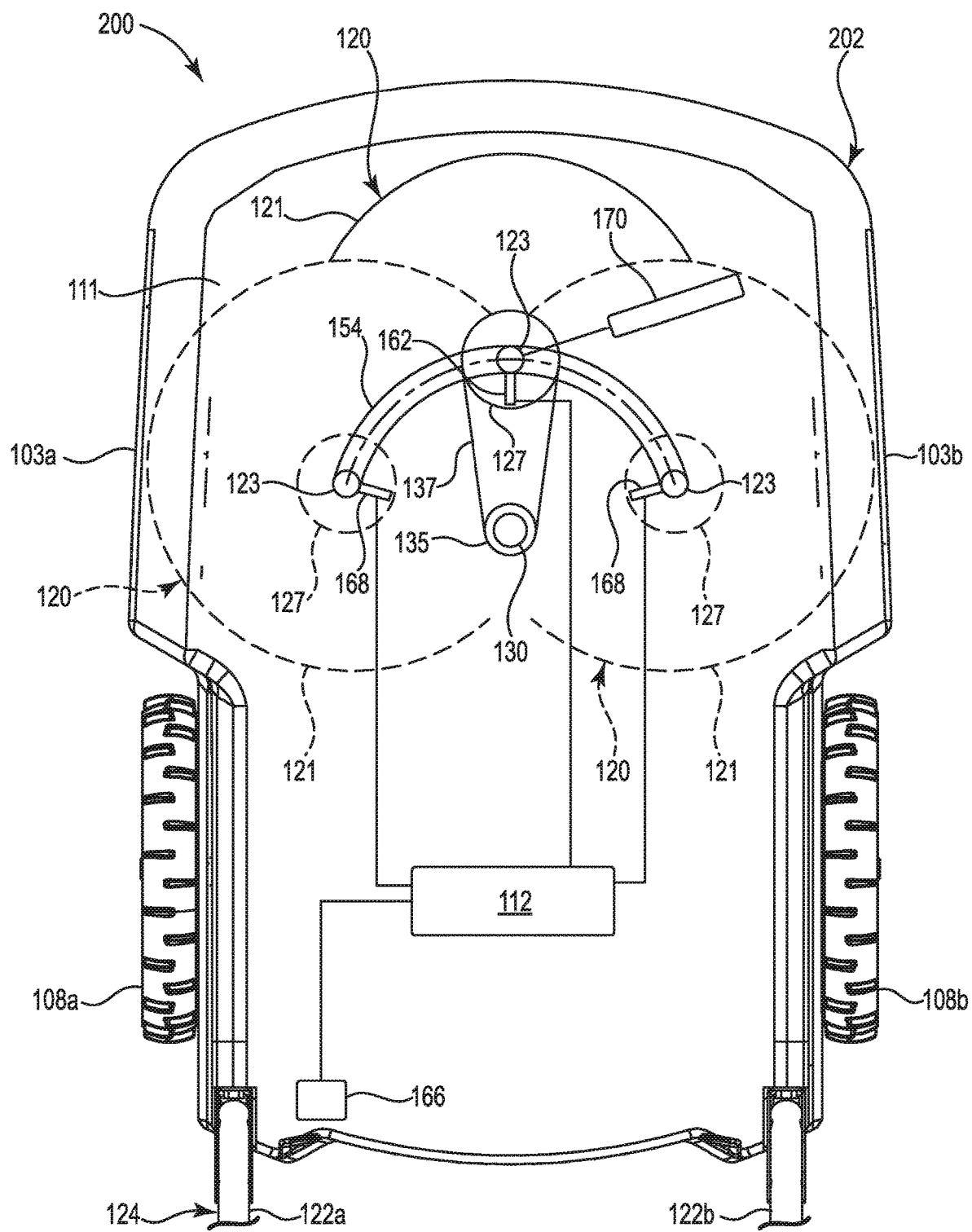
FIG. 7 is a diagrammatic top plan view of a mower in accordance with embodiments of the present disclosure illustrating reconfiguring the mower between the autonomous mode and the manual mode.

In some embodiments, the mower 100 may be reconfigured between the autonomous mode (FIG. 2) and the manual mode (FIG. 4) in response to the handle 124 being moved from the autonomous mode position of FIG. 1, to the manual mode position of FIG. 3. That is, in response to the handle being placed in the manual mode position, the cutting blade assembly 120 is adapted to move from the first position to the second position (conversely, in response to the handle being moved or placed in the autonomous mode position, the cutting blade assembly is adapted to move from the second position to the first position). For instance, FIG. 7 illustrates a mower 200 with a cutting deck 202 that accommodates movement of the cutting blade assembly 120 (illustrated diagrammatically in this view by a blade tip circle 121) relative to a fixed output shaft 130 of the motor 104 (note that those parts/features of the mower 200 that are similar or identical to like parts of the mower 100 are identified with the same, e.g., one hundred (lxx) series, reference numerals). That is, unlike the embodiment described above with reference to FIG. 4, the motor may remain stationary in the embodiment of FIG. 7. As shown in this figure, the cutting blade assembly 120 may include an independent shaft 123 having a driven sheave 127 coupled, by a drive belt 137, to a driving sheave 135 attached to the output shaft 130. The shaft 123 may slide along a curved slot 154 that, in one embodiment, is centered about an axis of the output shaft 130. When the mower 100 is configured in the autonomous mode, the blade assembly 120/circle 121 may be centered on the deck 102 in the first position as shown in solid lines. However, the slot 154 may accommodate physical movement (e.g., sliding) of the cutting blade assembly 120/shaft 123 toward one or both of the left sidewall 103a and the right sidewall 103b to accommodate manual operation of the mower 200.

In some embodiments, such movement of the cutting blade assembly 120 may be restricted unless the handle is in the manual mode position of FIG. 3. For instance, a lock 162 (e.g., mounted on the upper wall 111) may be provided that interacts with the cutting blade assembly. The lock 162 may be engaged or disengaged, either manually or under the control of the controller 112. When the lock 162 is engaged (e.g., when the handle is in the autonomous mode position), the cutting blade assembly 120 is held in the first position as shown in solid lines in FIG. 7. However, when the lock 162 is disengaged (e.g., when the handle is placed in the manual mode position), the cutting blade assembly is released and thus free to slide (e.g., manually move) along the slot 154, e.g., to the second position.

The lock 162 may include a switch in communication with the controller 112 of the mower 200. The controller 112 may further be in communication with a handle sensor or switch 166. The handle switch 166 is adapted to detect when the handle 124 is in the manual mode position (see FIG. 3) and/or in the autonomous mode position (see FIG. 1). The mower 100 may include one or more second locks 168 adapted to lock the cutting blade assembly 120 in the second position. Again, the locks 168 may be electronically controlled by the controller 112, or alternatively, could be manually controlled by the operator, and may also include switches that communicate the status of the locks 168 to the controller.

When the operator wishes to reconfigure the mower 100 from the autonomous mode to the manual mode, he or she may move the handle 124 from the position shown in FIG. 1 to the position shown in FIG. 3. Alternatively, when the handle 124 is configured as a removeable component, the handle may be attached to/detached from the cutting deck 102.

Movement to and/or locking of the handle 124 in the manual mode position may be detected by the handle switch 166 and a signal provided to the controller 112. Once the handle switch 166 detects that the handle is locked in the manual mode position, the operator may manually disengage the lock 162 and manually slide (e.g., via a protruding handle connected to the shaft 123 (not shown)) the cutting blade assembly 120 along the slot 154 to the second position (e.g., either proximate the left sidewall or right sidewall). Upon reaching the second position, the operator may manually engage the lock 168. Once engaged, a switch associated with the lock 168 may inform the controller 112 that the cutting blade assembly 120 is in the manual operating position, and manual mode operation may begin.

Various interlocks (e.g., including the switches associated with the locks 162 and 168) may be used to prevent operation of the mower unless the handle 124 and cutting blade assembly 120 are positioned as required for either autonomous mode operation or manual mode operation. For example, if the handle switch 166 detects that the handle 124 is in the autonomous mode position, but the switches 166, 168 detect that the cutting blade assembly is not in the first (centered position), the motor 104 may be prohibited from operating.

In some embodiments, the mower 100 could include an actuator, e.g., an electric ball screw 170, attached to a support for the shaft 123, wherein the actuator, when energized, is adapted to move the cutting blade assembly between the first and second positions. For example, the controller 112 may selective rotate the ball screw, causing the cutting blade assembly 120 to slide along the slot 154, displacing the cutting blade assembly relative to the deck 102/upper wall 111. That is, the screw may automate movement of the cutting blade assembly 120 (e.g., under control of the controller 112) relative to the upper wall between the first and second positions. In embodiments incorporating the screw or other actuator, the locks 162 and 168 may be unnecessary.

While described herein as incorporating electronic sensing of the handle 124 position, other embodiments may utilize mechanical structures to control and/or limit cutting blade assembly position. For example, movement of the handle 124 to the manual position may cause an arm connected to the handle to move. The arm may function as a lock (similar to the lock 162) such that, movement of the arm may release the motor to slide along the slot.

The embodiment illustrated in FIG. 7 assumes that only the cutting blade assembly 120 shifts from the first position (when the mower is in the autonomous mode) to the second position (when the mower is in the manual mode). This concept is not limiting as configurations wherein both the motor 104 and the cutting blade assembly 120 shift as a unit are also contemplated (see, for example, the cutting blade assembly 120 and output shaft 130 moving as one unit along a slot 134 in the upper wall 111 as indicated in FIG. 4).

Figure 8:
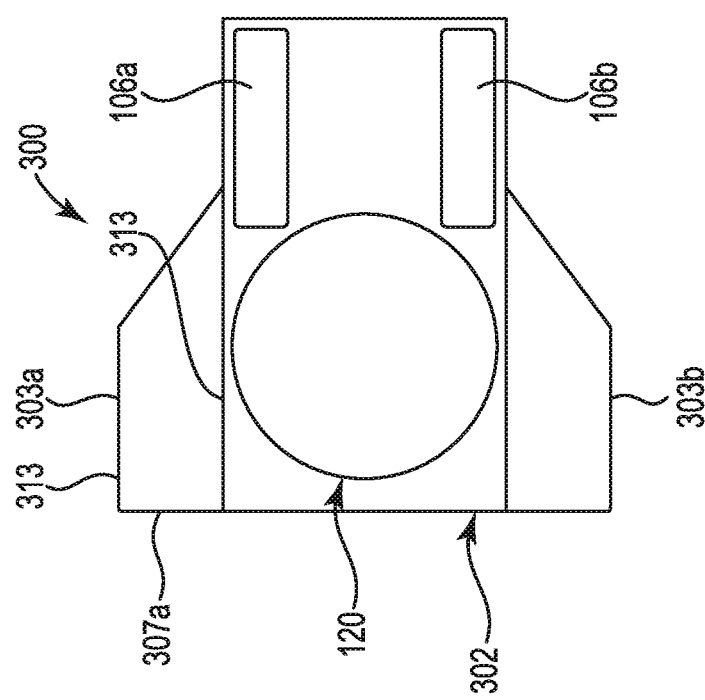
FIG. 8 is a diagrammatic bottom view of a mower in accordance with another embodiment of the disclosure.

Moreover, while shown herein as having a cutting blade assembly 120 that selectively moves (relative to the deck/trim edge) from a first or centered position to a second position proximate one of the sidewalls, other embodiments may maintain the cutting blade assembly 120 position, but selectively move the sidewall of the mower inwardly relative to the cutting blade assembly, or remove it entirely (e.g., move between first and second positions). For example, a mower 300 with a deck 302 and sidewalls 303a and 303b could be reconfigured between an autonomous mode and a manual mode by moving (e.g., repositioning between a first position and a second position and/or removing) portions of an outer shroud 307a (or other deck components) as shown in FIG. 8 to permit the cutting blade assembly 120 to effectively locate proximate a trim edge 313 of the mower. That is to say, the cutting blade assembly 120 may stay fixed relative to the upper wall 111 (see FIG. 2), and the transverse outer edges of the mower may be relocated to provide the manual trimming function. In the embodiment shown in FIG. 8, the shroud section 307a could be completely removable from the deck 302, or could move (e.g., pivot) out of the way to permit reconfiguration to the manual mode.

As stated above, regardless of the configuration of mechanism used to reposition the cutting blade assembly or sidewall/trim edge, various interlocks may be provided to ensure the motor is disabled unless the cutting blade assembly is in the defined first or second position and the handle is correspondingly positioned (e.g., for autonomous or manual mode).

Various illustrative embodiments are within the scope of this disclosure, some examples of which are identified in the following paragraphs.

Embodiment 1

An autonomous lawn mower comprising: a cutting deck including an upper wall and a trim edge; and a cutting blade assembly supported by the cutting deck, wherein the cutting blade assembly or the trim edge selectively moves, relative to the other of the cutting blade assembly or the trim edge, between a first position (e.g., corresponding to an autonomous mode of the mower) and a second position (e.g., corresponding to a manual mode of the mower).

Embodiment 2

The mower of Embodiment 1, wherein the trim edge is defined by a sidewall extending downwardly from the upper wall, and wherein the cutting blade assembly moves relative to the sidewall between the first position and the second position.

Embodiment 3

The mower of any one of Embodiments 1-2, wherein the cutting blade assembly, when in the second position, is located more closely to the trim edge than when in the first position.

Embodiment 4

The mower of any one of Embodiments 1-3, further comprising a prime mover attached to the upper wall and adapted to provide power to the cutting blade assembly.

Embodiment 5

The mower of Embodiment 4, wherein the prime mover moves with the cutting blade assembly between the first and second positions.

Embodiment 6

The mower of any one of Embodiments 1-5, further comprising a handle associated with the cutting deck.

Embodiment 7

The mower of Embodiment 6, wherein, in response to the handle being placed in a manual mode position, the cutting blade assembly is adapted to move from the first position to the second position.

Embodiment 8

The mower of any one of Embodiments 6-7, wherein, in response to the handle being placed in an autonomous mode position, the cutting blade assembly is adapted to move from the second position to the first position.

Embodiment 9

The mower of any one of Embodiments 1-5, further comprising a handle adapted to be located in an autonomous mode position and alternatively in a manual mode position.

Embodiment 10

The mower of Embodiment 9, further comprising a lock adapted to hold the cutting blade assembly in the first position when the handle is in the autonomous mode position.

Embodiment 11

The mower of Embodiment 10, wherein, when the handle is placed in the manual mode position, the lock is adapted to release and permit the cutting blade assembly to move to the second position.

Embodiment 12

The mower of any one of Embodiments 2-11, further comprising an actuator adapted to move the cutting blade assembly between the first position and the second position.

Embodiment 13

The mower of any one of Embodiments 1-12, wherein the trim edge is defined by a sidewall extending downwardly from the upper wall, and wherein the sidewall moves relative to the cutting blade assembly between the first position and the second position.

Embodiment 14

An autonomous lawn mower comprising: a cutting deck including an upper wall and downwardly extending sidewalls forming a cutting chamber, wherein at least one of the sidewalls forms a trim edge; wheels adapted to support the deck in rolling engagement upon a ground surface; and a rotatable cutting blade assembly contained within the cutting chamber, wherein the rotatable cutting blade assembly is positioned a first offset distance from the trim edge when the mower is configured in an autonomous mode, and wherein the rotatable cutting blade assembly is positioned a second offset distance from the trim edge when the mower is configured in a manual mode, the second offset distance being less than the first offset distance.

Embodiment 15

The mower of Embodiment 14, further comprising a handle adapted to connect to the cutting deck.

Embodiment 16

The mower of Embodiment 15, wherein the handle is configurable in an autonomous mode position corresponding to the cutting blade assembly being located at the first offset distance from the trim edge.

Embodiment 17

The mower of any one of Embodiments 15-16, wherein the handle is configurable in a manual mode position corresponding to the cutting blade assembly being located at the second offset distance from the trim edge.

Embodiment 18

The mower of any one of Embodiment 14-17, further comprising a prime mover attached to the upper wall, the prime mover adapted to provide power to one or both of the cutting blade assembly and at least one of the wheels.

Embodiment 19

The mower of Embodiment 18, wherein the upper wall further defines a slot, and wherein the prime mover and the cutting blade assembly are together slidable along the slot between a first position corresponding to the autonomous mode of the mower, and a second position corresponding to the manual mode of the mower.

Embodiment 20

A method of reconfiguring a robotic mower from an autonomous mode to a manual mode, comprising: re-locating a handle of the mower from an autonomous mode position to a manual mode position, wherein the handle, when in the manual mode position, is connected to a cutting deck and forms a grip area accessible to an operator walking behind the cutting deck, wherein the cutting deck further comprises an upper wall and a downwardly extending sidewall partially surrounding a cutting chamber; and moving either a cutting blade assembly contained within the cutting chamber or the sidewall from: a first position wherein the cutting blade assembly is spaced-apart from the sidewall by a first offset distance; to a second position wherein the cutting blade assembly is spaced-apart from the sidewall by a second offset distance that is less than the first offset distance.

Embodiment 21

The method of Embodiment 20, wherein re-locating the handle of the mower from the autonomous mode position to the manual mode position comprises pivoting the handle, relative to the deck, between the two positions.

Embodiment 22

The method of any one of Embodiments 20-21, wherein re-locating the handle of the mower from the autonomous mode position to the manual mode position comprises attaching the handle to the cutting deck.

Embodiment 23

The method of any one of Embodiments 20-22, wherein moving either the cutting blade assembly or the sidewall comprises manually moving the cutting blade assembly or the sidewall.

Embodiment 24

The method of any one of Embodiments 20-22, wherein moving either the cutting blade assembly or the sidewall comprises energizing an actuator adapted to displace the cutting blade assembly relative to the upper wall.

Embodiment 25

An autonomous lawn mower comprising: a cutting deck; a cutting blade assembly supported by the cutting deck; a handle connected the cutting deck, the handle configurable in an autonomous mode position and a manual mode position; and a cradle adapted to receive a tablet or smartphone therein.

Embodiment 26

The mower of Embodiment 25, wherein the cradle is connected to the handle.

The complete disclosures of the patents, patent documents, and publications cited herein are incorporated by reference in their entirety as if each were individually incorporated.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. An autonomous lawn mower comprising:
   a cutting deck comprising an upper wall and downwardly extending sidewalls forming a partially enclosed, downwardly opening cutting chamber; and
   a cutting blade assembly supported by the cutting deck, wherein the cutting blade assembly shifts laterally relative to the cutting deck as the mower is reconfigured between autonomous and manual modes, wherein when the mower is in the autonomous mode, the cutting blade assembly is located at a first position within the cutting chamber that is spaced-apart from one sidewall by a first offset distance, and when the mower is in the manual mode, the cutting blade assembly is repositioned to a second position that is closer, as compared to the first position, to the one sidewall.

2. The mower according to claim 1, wherein the one sidewall forms a trim edge of the mower.

3. The mower according to claim 2, wherein a cutting path of the cutting blade assembly is transversely shifted, relative to the deck, toward the one sidewall when the mower is in the manual mode.

4. The mower according to claim 1, further comprising a prime mover attached to the upper wall and adapted to provide power to the cutting blade assembly, wherein the prime mover moves with the cutting blade assembly between the first and second positions.

5. The mower according to claim 1, further comprising a handle associated with the cutting deck, wherein, in response to the handle being placed in a manual mode position, the cutting blade assembly is adapted to move from the first position to the second position.

6. The mower according to claim 5, wherein, in response to the handle being placed in an autonomous mode position, the cutting blade assembly is adapted to move from the second position to the first position.

7. The mower according to claim 1, further comprising:
   a handle adapted to be located in an autonomous mode position and alternatively in a manual mode position; and
   a lock adapted to hold the cutting blade assembly in the first position when the handle is in the autonomous mode position, wherein, when the handle is placed in the manual mode position, the lock is adapted to release and permit the cutting blade assembly to move to the second position.

8. The mower according to claim 1, further comprising an actuator adapted to move the cutting blade assembly between the first position and the second position.

9. An autonomous lawn mower comprising:
   a cutting deck comprising an upper wall and downwardly extending sidewalls forming a cutting chamber, wherein at least one of the sidewalls forms a trim edge;
   wheels adapted to support the deck in rolling engagement upon a ground surface;
   a rotatable cutting blade assembly contained within the cutting chamber, wherein the rotatable cutting blade assembly is positioned a first offset distance from the trim edge when the mower is configured in an autonomous mode, and wherein the rotatable cutting blade assembly is positioned a second offset distance from the trim edge when the mower is configured in a manual mode, the second offset distance being less than the first offset distance; and
   a handle adapted to connect to the cutting deck and configurable in: an autonomous mode position corresponding to the cutting blade assembly being located at the first offset distance from the trim edge, and a manual mode position, corresponding to the cutting blade assembly being located at the second offset distance from the trim edge.

10. The mower according to claim 9, further comprising a prime mover attached to the upper wall, the prime mover adapted to provide power to one or both of the cutting blade assembly and at least one of the wheels.

11. The mower according to claim 10, wherein the upper wall further defines a slot, and wherein the prime mover and the cutting blade assembly are together slidable along the slot between a first position corresponding to the autonomous mode of the mower, and a second position corresponding to the manual mode of the mower.

12. A method of reconfiguring a robotic mower from an autonomous mode to a manual mode, comprising:
   re-locating a handle of the mower from an autonomous mode position to a manual mode position, wherein the handle, when in the manual mode position, is connected to a cutting deck and forms a grip area accessible to an operator walking behind the cutting deck, wherein the cutting deck further comprises an upper wall and a downwardly extending sidewall partially surrounding a cutting chamber; and
   moving either a cutting blade assembly contained within the cutting chamber or the sidewall from: a first position wherein the cutting blade assembly is spaced-apart from the sidewall by a first offset distance; to a second position wherein the cutting blade assembly is spaced-apart from the sidewall by a second offset distance that is less than the first offset distance.

13. The method according to claim 12, wherein re-locating the handle of the mower from the autonomous mode position to the manual mode position comprises pivoting the handle, relative to the deck, between the two positions.

14. The method according to claim 12, wherein re-locating the handle of the mower from the autonomous mode position to the manual mode position comprises attaching the handle to the cutting deck.

15. The method according to claim 12, wherein moving either the cutting blade assembly or the sidewall comprises manually moving the cutting blade assembly or the sidewall.

16. The method according to claim 12, wherein moving either the cutting blade assembly or the sidewall comprises energizing an actuator adapted to displace the cutting blade assembly relative to the upper wall.

* * * * *